United States Patent
Bandyopadhyay et al.

(10) Patent No.: US 8,728,354 B2
(45) Date of Patent: May 20, 2014

(54) ELECTRICALLY CONDUCTING COMPOSITIONS

(75) Inventors: Sumanda Bandyopadhyay, Karnataka (IN); Vishwasrao Vasant Gawade, Bangalore, IN (US); Soumyadeb Ghosh, Bangalore (IN); Ramya Kumaraswamy, Karnataka (IN); Franciscus Petrus Maria Mercx, Bergen op Zoom (NL); Suchetana Shetty, Karnataka (IN)

(73) Assignee: Sabic Innovative Plastics IP B.V. (NL)

( * ) Notice: Subject to any disclaimer, the term of this patent is extended or adjusted under 35 U.S.C. 154(b) by 537 days.

(21) Appl. No.: 11/942,766

(22) Filed: Nov. 20, 2007

(65) Prior Publication Data

US 2008/0116424 A1 May 22, 2008

Related U.S. Application Data

(60) Provisional application No. 60/866,492, filed on Nov. 20, 2006.

(51) Int. Cl.
*H01B 1/02* (2006.01)
(52) U.S. Cl.
USPC ........... 252/512; 252/511; 252/513; 252/514; 219/217; 428/209; 428/210
(58) Field of Classification Search
USPC ................... 252/511–514; 338/47; 219/217; 428/209–210
See application file for complete search history.

(56) References Cited

U.S. PATENT DOCUMENTS

| | | | |
|---|---|---|---|
| 4,545,926 A | 10/1985 | Fouts, Jr. et al. | |
| 4,560,498 A | 12/1985 | Horsma et al. | |
| 5,171,774 A | 12/1992 | Ueno et al. | |
| 5,334,330 A * | 8/1994 | Rowlette | 252/512 |
| 5,378,407 A | 1/1995 | Chandler et al. | |
| 5,554,679 A | 9/1996 | Cheng | |

(Continued)

FOREIGN PATENT DOCUMENTS

| | | |
|---|---|---|
| EP | 0040537 | 5/1981 |
| EP | 0038714 | 10/1981 |

(Continued)

OTHER PUBLICATIONS (Heat Deflection Temperature of Phenolic)—http://matweb.com/search/PropertySearch.aspx.*

(Continued)

*Primary Examiner* — Khanh Tuan Nguyen
(74) *Attorney, Agent, or Firm* — Cantor Colburn LLP

(57) ABSTRACT

Disclosed herein is an electrically conducting polymer composition and method of making a composition including an organic polymer; and a first filler including at least one ceramic filler, at least one metallic filler, or a combination including at least one of the foregoing fillers, wherein a trip temperature of the composition does not change by an amount of greater than or equal to ±10° C. when the composition is cycled 100 times between room temperature and the trip temperature. Disclosed herein as well is an electrically conducting polymer composition including a first filler including at least one ceramic filler, at least one metallic filler, or a combination including at least one of the foregoing fillers and a second filler. The compositions of the present invention have a trip temperature that is lower than the HDT temperature of the composition and can have tunable trip temperatures.

23 Claims, 1 Drawing Sheet

(56) References Cited

U.S. PATENT DOCUMENTS

| | | | |
|---|---|---|---|
| 5,705,555 | A | 1/1998 | Guilfoy et al. |
| 5,747,147 | A | 5/1998 | Wartenberg et al. |
| 5,793,276 | A | 8/1998 | Tosaka et al. |
| 5,858,533 | A | 1/1999 | Greuter et al. |
| 5,928,547 | A | 7/1999 | Shea et al. |
| 5,968,419 | A * | 10/1999 | Sadhir et al. ............... 252/512 |
| 5,985,976 | A | 11/1999 | Wartenberg et al. |
| 6,114,433 | A | 9/2000 | Chung et al. |
| 6,197,220 | B1 | 3/2001 | Biok et al. |
| 6,274,852 | B1 | 8/2001 | Biok et al. |
| 6,290,879 | B1 | 9/2001 | Duggal et al. |
| 6,358,438 | B1 | 3/2002 | Isozaki et al. |
| 6,359,544 | B1 | 3/2002 | Blok |
| 6,373,372 | B1 | 4/2002 | Duggal et al. |
| 6,429,766 | B1 | 8/2002 | Glatz-Reichenbach et al. |
| 6,452,476 | B1 | 9/2002 | Handa |
| 6,479,575 | B1 | 11/2002 | Chu et al. |
| 6,579,931 | B1 | 6/2003 | Hall |
| 6,599,446 | B1 * | 7/2003 | Todt et al. ............... 252/511 |
| 6,607,679 | B2 | 8/2003 | Handa et al. |
| 6,620,343 | B1 | 9/2003 | Blok et al. |
| 6,660,795 | B2 | 12/2003 | Blok |
| 6,669,746 | B2 | 12/2003 | Niizaki et al. |
| 6,778,062 | B2 | 8/2004 | Handa et al. |
| 6,932,928 | B2 | 8/2005 | Strumpler et al. |
| 2002/0128333 | A1 | 9/2002 | Tang et al. |
| 2003/0015285 | A1 | 1/2003 | Iwamoto et al. |
| 2003/0060353 | A1 | 3/2003 | Miki et al. |
| 2003/0091829 | A1 | 5/2003 | Handa et al. |
| 2003/0234717 | A1 | 12/2003 | Nihira et al. |
| 2004/0001954 | A1 | 1/2004 | Korzhenko et al. |
| 2004/0104803 | A1 * | 6/2004 | Bower et al. ............... 338/47 |
| 2004/0113127 | A1 | 6/2004 | Min et al. |
| 2005/0139811 | A1 | 6/2005 | Aisenbrey |
| 2006/0108566 | A1 | 5/2006 | Ma et al. |
| 2008/0142494 | A1 * | 6/2008 | Blake et al. ............... 219/217 |

FOREIGN PATENT DOCUMENTS

| | | |
|---|---|---|
| EP | 0138424 | 9/1983 |
| EP | 0435574 | 12/1990 |
| EP | 0548162 | 9/1991 |
| EP | 0643869 | 6/1993 |
| EP | 0764187 | 6/1995 |
| EP | 0762437 | 8/1996 |
| EP | 0758131 | 2/1997 |
| JP | 2086087 | 3/1990 |
| JP | 3195782 | 8/1991 |
| JP | 4014202 | 2/1992 |
| JP | 04115501 | 4/1992 |
| JP | 04273104 | 9/1992 |
| JP | 088106 | 4/1996 |
| JP | 8096931 | 4/1996 |
| JP | 10214705 | 8/1998 |
| JP | 10223406 | 8/1998 |
| JP | 20109693 | 4/2000 |
| JP | 21085203 | 3/2001 |
| WO | WO9930329 | 6/1999 |

OTHER PUBLICATIONS (Heat Deflection Temperature of Polyimides)—http://matweb.com/search/PropertySearch.aspx.*

(Heat Deflection Temperature of Polyurethane)—http://matweb.com/search/PropertySearch.aspx.*

TR Shrout (Pennsylvania State Univ), A Casciani, M Mulvihill; D. Smith; W. Heubner; Optimum TiB2 ceramic powder for composite thermistors; Source: Journal of Materials Science Letters, v9, n5, May, 1990, p. 611-612.

Dawne M. Moffatt (Pennsylvania State Univ); James P. Runt; Arvind Halliyal; Robert E. Newnham; Metal oxide-polymer thermistors; Source: Journal of Materials Science, v24, n2, Feb. 1989, p. 609-614.

L. Nicodemo; L. Nicolais; G. Romero; E. Scafora; Temperature effect on the electrical resistivity of metal/polymer composites; Source: Polymer Engineering and Science, v18, n4, Mar. 1978, p. 293-298.

R. Strumpler (ABB Corporate Research Ltd); J. Glatz-Reichenbach; Conducting polymer composites; Source: Mat. Res. Soc. Symp. Proc., vol. 699, Nov. 2002, p. 83-91.

R. Strumpler (ABB Corporate Research Ltd); J. Glatz-Reichenbach; Conducting polymer composites; Source: Journal of Electroceramics, v3, n4, Nov. 1999, p. 329-346.

Frank Doljack (Raychem Corp); Polyswitch ptc devices—a new, low resistance, conductive polymer-based PTC device for overcurrent protection; Source: Proceedings—Electronic Components Conference, 1981, p. 313-319.

Drawings for U.S. Patent 4,545,926; dated Oct. 8, 1985; Figure 1 through Figure 8, (4 pages).

Bisphenol A. Epoxy Resin; Specification Sheet; May 2008; TriInternational Inc.

Heat Deflection Temperature Testing of Plastics; MatWeb, Material Property Data. http://www.matweb.com/reference/deflection-temperature.aspx.

Dow Amplify(™) EA 101 Ethylene-ethyl Acrylate (EEA); MatWeb; Material Property Data http://www.matweb.com/search.

Drawings for U.S. Patent 5,968,419; dated Oct. 19, 1999; Figure 3 and Figure 5.

CN1412782—English translation of Abstract and Claims; Cited by the Examiner in Office Action for China Patent Application 200780042757.5 dated Apr. 5, 2012—14 Pages.

* cited by examiner

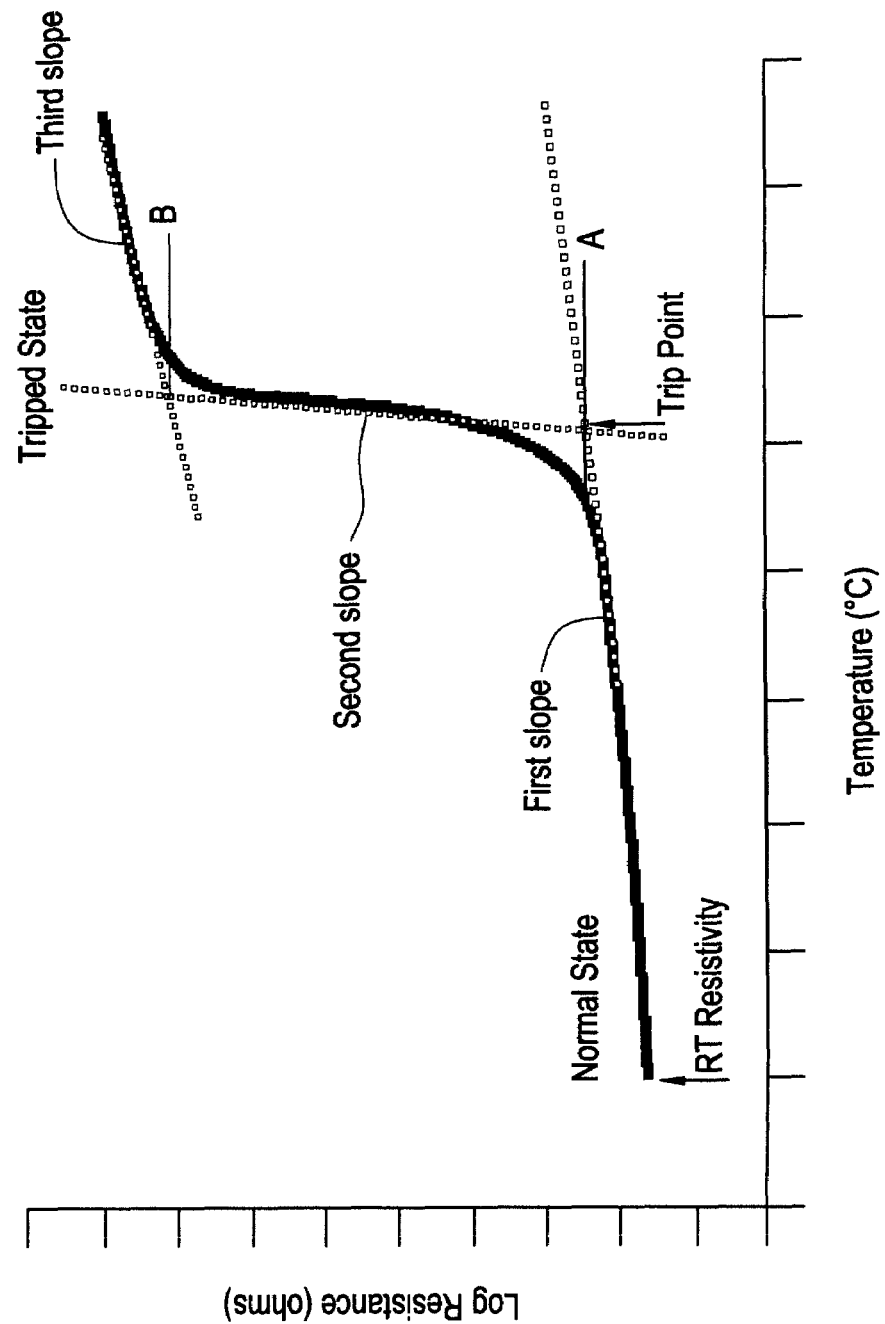

ELECTRICALLY CONDUCTING COMPOSITIONS

CROSS REFERENCE TO RELATED APPLICATIONS

This application claims priority to U.S. Provisional Application No. 60/866,492, which was filed Nov. 20, 2006, which is hereby incorporated by reference in its entirety.

FIELD OF THE INVENTION

The present invention relates to thermally regulated electrically conducting compositions, methods of manufacture thereof and articles containing the same.

BACKGROUND OF THE INVENTION

Polymer compositions are used for a plurality of technical applications. For electrical applications, the bulk and surface resistivity of a polymeric composition can vary over many orders of magnitude from being highly electrically conducting to being highly electrically insulating. This variation in electrical resistivity is generally dependent upon the amount of electrically conducting filler contained in the polymeric composition.

Changing the temperature can also bring about a change in the electrical resistivity of an electrically conducting polymer composition. For example, at low temperatures, the resistance of the electrically conducting polymer composition is low and allows a large amount of electrical current to flow through the polymeric composition. As the temperature is increased up to a point, there is an increase in the electrical resistivity of the polymeric composition. A function/curve of the electrical resistivity with temperature has a positive slope and within this temperature range, the electrically conducting polymer composition is said to have a positive temperature coefficient resistance (PTCR).

According to one theory, it is believed that a mismatch between the coefficient of thermal expansion between the polymer and electrically conducting filler causes a localized disruption in the electrically conducting network that leads to an increase in the electrical resistivity of the composition. In most cases, the required thermal expansion is caused by a phase transition, such as melting, of the polymer leading to the PTCR near the trip temperature. This however often leads to deterioration of mechanical properties of the composition near the trip temperature, as for example, one would expect from melting of the polymer matrix. It is therefore beneficial for the electrically conducting polymer composition to display the PTCR trip behavior below a temperature where no such deterioration of mechanical properties takes place. In still another theory, the physical and electrical properties of the electrically conducting filler are believed to change with temperature causing a change in the electrical resistivity of the polymeric composition.

As the temperature is raised further, however, often the electrical resistivity of the polymeric composition drops with temperature. The electrically conducting polymer composition now displays a negative temperature coefficient of resistance (NTCR). This change from PTCR behavior to a strong NTCR behavior is often undesirable. There have been several theories put forth to explain this behavior.

While the aforementioned theories purport to explain this behavior in the electrical resistivity, there are some applications for which such behavior is undesirable. It is therefore beneficial to have polymer compositions for certain applications where the change in behavior from a PTCR polymeric composition to a NTCR polymeric composition is minimized. In other words, it is beneficial for the electrically conducting polymer composition to display only PTCR behavior over the temperature range of the intended application.

To get positive temperature coefficient to resistivity (PTCR) effect, the composite material should be conductive. In order to make a composition conductive, the prior art added conductive filler particles above the percolation threshold. The percolation threshold is the point at which the formation of long-range connectivity in random systems. Below the percolation threshold, a composite will be non-conductive. However, loading of high percentage of high specific gravity fillers, like metal, increases the specific gravity of the composite considerably.

Accordingly, it would be beneficial to provide a way of reducing the specific gravity of the composition and increasing the performance to cost ratio by adding low specific gravity second fillers in tuning the trip characteristics of PTCR formulation.

SUMMARY OF THE INVENTION

Disclosed herein is an electrically conducting polymer composition including an organic polymer; and a first filler. The first filler may be an electrically conducting material and may include at least one ceramic filler, at least one metallic filler, or a combination including at least one of the foregoing fillers. The electrically conducting composition has a trip temperature that does not change by an amount of greater than or equal to ±10° C. when the composition is cycled between room temperature and the trip temperature 100 times as based upon measurements that are taken on the $2^{nd}$ and $100^{th}$ cycle.

Also disclosed herein is a method of making an electrically conducting polymer composition including blending an organic polymer with a first filler including at least one ceramic filler, at least one metallic filler, or a combination including at least one of the foregoing fillers to form an electrically conducting polymer composition, wherein the first filler includes a filler having a hardness of greater than or equal to 500 Vickers; and molding the electrically conducting polymer composition.

Disclosed herein as well is an electrically conducting polymer composition including an organic polymer; and a first filler including at least one ceramic filler, at least one metallic filler, or a combination including at least one of the foregoing fillers, wherein the composition has a trip temperature less than the heat deflection temperature (HDT) of the composition at 0.45 MPa and wherein the difference between the trip temperature and the heat deflection temperature is 10° C. or greater. As such, the compositions of the present invention "trip" at a temperature below a point where the plastic begins to be deformed.

Disclosed herein in another embodiment is a method of making a composition that includes the steps of blending an organic polymer with a first filler including at least one ceramic filler, at least one metallic filler, or a combination including at least one of the foregoing fillers and a second filler selected from conductive fillers, non-conductive fillers, or a combination thereof to generate a continuous network; and molding the electrically conducting polymer composition, wherein at least one of the ceramic filler, the metallic filler, or both, has a hardness of greater than or equal to 500 Vickers.

Disclosed herein in yet another embodiment is an electrically conducting polymer composition including an organic polymer; a first filler including at least one ceramic filler, at least one metallic filler, or a combination including at least one of the foregoing fillers, and a second filler including a conductive filler, a non-conductive filler, or a combination thereof wherein the second filler is used to tune the trip characteristics of the PTCR formulation.

Also disclosed herein is an electrically conducting polymer composition including an organic polymer; and a first filler including at least one ceramic filler, at least one metallic filler, or a combination including at least one of the foregoing fillers, wherein the trip characteristics of the polymer composition have been altered by at least one process technique (such as injection, compression, injection-compression, thermoforming), at least one post processing technique, or a combination including at least one of the foregoing techniques.

Disclosed herein as well is an electrically conducting polymer composition including an organic polymer; and a first filler including at least one ceramic filler, at least one metallic filler, or a combination including at least one of the foregoing fillers, wherein the onset of trip temperature is governed by specific volume changes taking place as a function of temperature. In one embodiment, the percentage specific volume change of the composite is between to 0.5-5% at the trip temperature when measured from room temperature. In another embodiment, the percentage specific volume expansion is in the range of 1-2% at the trip temperature.

BRIEF DESCRIPTION OF THE DRAWINGS

The FIGURE is an exemplary depiction of the behavior of an electrically conducting polymer composition when subjected to a change in temperature.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

Disclosed herein are electrically conducting polymer compositions that have a room temperature volume resistivity of less than or equal to $1 \times 10^4$ ohm-cm at room temperature and a positive temperature coefficient of resistance (PTCR) intensity of at least 5. In one embodiment, the polymeric composition does not undergo a transition from a PTCR to a NTCR. In another embodiment, the polymeric composition displays a transition from a PTCR to a NTCR.

The FIGURE is an exemplary depiction of the behavior of an electrically conducting polymer composition when subjected to a change in temperature. The FIGURE depicts the changes in electrical resistivity when the material is subjected to a change in temperature. As can be seen at the trip point, there is a change in resistivity of several orders of magnitude. The trip point is indicated by the letter (A) in the FIGURE. Prior to trip point, the resistivity of the polymeric composition does not change very much with a change in temperature. The slope of the resistivity curve prior to the trip point is referred to in the FIGURE as the first slope. After the trip point, there is an increase of several orders of magnitude in the resistivity with temperature. This is referred to as the second slope. The trip point (A) is defined as the intersection of a tangent taken to the first slope with a tangent taken to the second slope. After the resistivity increases rapidly with temperature it begins to level off and reaches a fairly stable value. This portion of the resistivity curve is referred to as the third slope. As seen in the FIGURE, a tangent to the second slope intersects with a tangent to the third slope at the point B. The PTCR intensity is defined as the ratio of electrical resistivity at a temperature represented by the intersection of the third slope with the second slope to the electrical resistivity at room temperature (RT).

The trip temperature of the composition further does not change substantially when the composition is cycled 100 times between room temperature and the trip temperature based upon measurements taken on the $2^{nd}$ and $100^{th}$ cycles. In one embodiment, the trip temperature of the composition does not change by an amount of greater than or equal to $\pm 10°$ C. when the composition is cycled 100 times between room temperature and the trip temperature based upon measurements taken on the $2^{nd}$ and $100^{th}$ cycles. In another embodiment, the trip temperature of the composition does not change by an amount of greater than or equal to $\pm 5°$ C. when the composition is cycled 100 times between room temperature and the trip temperature based upon measurements taken on the $2^{nd}$ and $100^{th}$ cycles. In yet another embodiment, the trip temperature of the composition does not change by an amount of greater than or equal to $\pm 2°$ C. when the composition is cycled 100 times between room temperature and the trip temperature based upon measurements taken on the $2^{nd}$ and $100^{th}$ cycles.

The compositions advantageously have a PTCR repeatability of at least 100 cycles when cycled between room temperature and the trip temperature based upon measurements taken on the $2^{nd}$ and $100^{th}$ cycles. In other words, in one embodiment, a difference in room temperature resistivity between the $2^{nd}$ cycle and the $100^{th}$ cycle is less than or equal to a factor of 5. In another embodiment, the difference in room temperature resistivity between the $2^{nd}$ cycle and the $100^{th}$ cycle is less than or equal to a factor of 4.

The electrically conducting polymer compositions advantageously include an organic polymer, and 1 to 95 weight percent (wt %) of a first electrically conducting filler. As used herein, the term "first filler" is used to include those embodiments wherein the compositions only include one filler and does not require that the compositions of the present invention include more than one filler. The electrically conducting fillers may be selected from metallic fillers and ceramics that generally have a hardness of greater than or equal to 500 Vickers. As used herein, "metallic fillers" include metal powders, metal-coated particles or any other conductive, metal-containing particles. In one embodiment, electrically conducting fillers are present in the composition in an amount of 5 to 65 wt %, based on the total weight of the composition. In another embodiment electrically conducting fillers are present in the composition in an amount of 10 to 40 wt %, based on the total weight of the composition. In alternative embodiments, the electrically conducting polymeric compositions may also include up to 20 wt % of a second electrically conducting filler composition and up to 20 wt % of reinforcing fibers and up to 5 wt % of other additives such as flow promoters, heat stabilizers, release agents, or the like.

In one embodiment, to make the composition conductive, conductive filler particles are added above the percolation threshold. At loadings below the percolation threshold, the distance between filler particles is large. Increasing the filler content decreases the distance between the filler particles. In the vicinity of the percolation threshold, filler particles come into contact with one another or are sufficiently close to one another to form a continuous or substantially continuous conductive path or network. Once the percolation is reached, additional filler loading does not greatly change the resistivity because the conductive network has already been established.

However, the addition of high volume of metallic and/or ceramic fillers can lead to high specific gravity of the composite. In addition, using large amounts of the fillers can significantly increase the cost of the composite since these fillers can be expensive, for instance tool steel powders. As such, to get the conductivity and PTCR trip characteristics at lower percolation levels of the first filler, the present invention, in an alternative embodiment, may use at least one second filler. Second fillers may be selected from conducting fillers, non-conducting fillers, or a combination thereof. The addition of conductive fillers (such as carbon black, carbon nanotubes, etc.) or non-conductive fillers (such as glass particles, glass fibers, nanoclays etc.) to the conducting first filler particles help in tuning the trip characteristics of PTCR formulations by bridging the gap between the first particles by forming a conducting network or modifying the effective dispersion of first conductive filler. As such, by using a conductive second filler, the trip temperature can be tuned or adjusted downward. Conversely, by using a non-conductive filler, the trip temperature can be tuned/adjusted upward compared to a formulation not containing the second filler.

With the addition of a second filler, the effective volume of the first filler in the composite increases which brings about the conductivity and trip characteristics. As discussed, the addition of a conductive filler can act as a synergist for increase in conductivity of composite. At a given first filler loading, the higher percentage of non-conductive second fillers increases the effective volume of the first filler and the trip characteristics exhibited by the composite is comparable to the trip characteristics exhibited by composite with higher filler loading of first filler.

In one embodiment, second fillers are added below the percolation level of first fillers. In another embodiment, the second fillers are added above the percolation level of first fillers. In one aspect, when the first filler is added below the percolation threshold, addition of conducting second filler (below the percolation threshold of the second filler in the polymer) can make the composite conductive and/or make a composite that exhibits PTCR characteristics.

In one aspect, addition of non-conducting second filler would increase the effective loading of the first filler in the resin media. This increases the trip temperature of the composite. As discussed, when higher concentrations of non-conducting fillers are added, the trip temperature increases further. However, at a given point, any beneficial effects of adding additional fillers as it relates to adjusting the trip temperature are reduced. In general, if the first conductive filler is added above 65 wt %, the trip temperature remain constant. Therefore, if a higher trip temperature is desired, in one embodiment, the first filler is tool steel powder and second filler is glass powder. If a lower trip temperature is desired, then in one embodiment, the first filler is tool steel powder and second filler is carbon black.

In general, second fillers are present in the composition in an amount of up to 70 wt % based on the total weight of the composition. In another embodiment, second fillers are present in the composition in an amount of 5 to 65 wt %, based on the total weight of the composition. In yet another embodiment second fillers are present in the composition in an amount of 10 to 30 wt %, based on the total weight of the composition. The electrically conducting polymer compositions may also include up to 5 wt % of other additives such as flow promoters, heat stabilizers, flame retardants, release agents, adhesion promoters like silanes, titanates, zirconates, or the like.

In addition to the use of one or more fillers to control the PTC characteristics of the thermoplastic compositions of the present invention, it is also possible to adjust the PTC characteristics by varying the processing techniques and/or by using variations in the processing steps in which the compositions are manufactured.

Accordingly, in one embodiment, the trip temperature of the thermoplastic compositions can be varied by using different processing conditions like injection molding, compression molding or combinations of the two. By forming the part in injection molding process the trip temperature is lower than that observed in compression molding. Furthermore by changing the processing conditions like mold temperature the trip temperature of the resultant composite can be tuned.

Accordingly, in one embodiment, the trip temperature of the thermoplastic compositions is controlled using an additional processing step. The additional processing step may be performed in-line (i.e. during formation of the polymeric part) and/or as a post-processing step after the polymer has been molded into an article. The additional processing step may be selected from a cooling or a heating step to adjust the trip temperature of the compositions. In one embodiment, a cooling process is used to cool the composition after being processed. This cooling process will cause the trip temperature of the composition to be reduced. Conversely, using a heating step after processing will result in a composition having a higher trip temperature. In general, the more extreme/rapid the cooling step, of the melt at the final part forming the lower the trip temperature can be tuned or adjusted to. Accordingly, in one embodiment, after being when, or immediately formed, the part is subjected to a quenching in a liquid nitrogen bath. In this embodiment, the rapid cooling will cause a substantial drop in the trip temperature. In another embodiment, the composition is subjected to a water quenching. In this embodiment, the cooling will cause a drop in the trip temperature, but not as substantial a drop as for the liquid nitrogen bath. If a higher trip temperature is desired, then a post-processing heating step, such as annealing the composition, can be used to raise the trip temperature above the "normal" trip temperature for a given composition.

In addition to any post-processing and/or molding steps, the characteristics of the PTC compositions can also be varied using the specific volume change of the compositions. Different polymers based on the backbone structure would occupy different specific volumes. Close to the trip temperature, the specific volume expansion of the different polymer composites is around 0.5-5% compared to the room temperature specific volume.

The organic polymer used in the electrically conducting polymer compositions may be selected from a wide variety of thermoplastic resins, thermosetting resins, blends of thermoplastic resins, blends of thermosetting resins, or blends of thermoplastic resins with thermosetting resins, thermoplastic elastomers or blends of thermoplastic elastomers. The organic polymer can include a blend of polymers, copolymers, terpolymers, ionomers, or combinations including at least one of the organic polymers.

The organic polymers can include semi-crystalline polymers or amorphous polymers. Examples of the organic polymers that can be used are polyolefins such as polyethylene, polypropylene; polyamides such as Nylon 4,6, Nylon 6, Nylon 6,6, Nylon 6, 10, Nylon 6, 12; polyesters such as polyethelene terephthalate (PET), polybutylene terephthalate (PBT), poly(1,4-cyclohexane-dimethanol-1,4-cyclohexanedicarboxylate) (PCCD), poly(trimethylene terephthalate) (PTT), poly(cyclohexanedimethanol-co-ethylene terephthalate) (PETG), poly(ethylene naphthalate) (PEN), poly(butylene naphthalate) (PBN); polyarylates, polyimides, polyacetals, polyacrylics, polycarbonates (PC), polystyrenes, polyamideimides, polyacrylates, polymethacrylates such as polymethylacrylate, or polymethylmethacrylate (PMMA); polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, polyolefins, or the like, or a combination including at least one of the foregoing organic polymers. Exemplary organic polymers are polycarbonates, polyolefins, polyamides, polyetherimides, polystyrenes or polyacrylates.

In an additional embodiment, epoxy or anhydride modified polyolefins, ethylene-acrylate and styrenics, or a combination thereof may be used as the primary resin or, in an alternative embodiments, in amounts up to 10 wt % to improve the adhesion between the organic polymer used as the base resin and the first and/or second fillers.

Examples of blends of organic polymers that can be used include acrylonitrile-butadiene-styrene/nylon, polycarbonate/acrylonitrile-butadiene-styrene, polyphenylene ether/polystyrene, polyphenylene ether/polyamide, polycarbonate/polyester blends, such as, for example PC-PCCD, PC-PETG, PC-PET, PC-PBT, PC-PCT, PC-PPC, PC-PCCD-PETG, PC-PCCD-PCT, PC-polyarylates, polyamide-polyolefin, polycarbonate/polyetherimide, polyphenylene ether/polyolefin, or the like, or a combination including at least one of the foregoing blends of organic polymers.

Examples of copolymers that may be used in the composition are ethylene vinyl acetate, ethylene vinyl alcohol, ethylene ethyl acrylate, ethylene methyl acrylate, ethylene butyl acrylate, ethane-octene copolymers, MAH-grafted copolymers, GMA-grafted copolymers, copolyestercarbonates, polyetherimide-polysiloxanes, or the like, or a combination including at least one of the foregoing polymers.

In one embodiment, the organic polymers can be thermosetting organic polymers. Examples of thermosetting organic polymers are epoxies, phenolics, polyurethanes, polysiloxanes, or the like, or a combination including at least one of the foregoing thermosetting organic polymers. In still other embodiments, the organic polymers can be cross-linked thermoplastics polymers.

The organic polymers are generally used in amounts of 5 to 95 weight percent (wt %) of the total weight of the electrically conducting polymer composition. In one embodiment, the organic polymers are generally used in amounts of 10 to 65 wt % of the total weight of the electrically conducting polymer composition. In another embodiment, the organic polymers are generally used in amounts of 15 to 60 wt % of the total weight of the electrically conducting polymer composition. In yet another embodiment, the organic polymers are generally used in amounts of 20 to 55 wt % of the total weight of the electrically conducting polymer composition.

As noted above, the first filler includes at least one ceramic filler, at least one metallic filler or a combination including at least one of the foregoing fillers. In one embodiment, it is generally beneficial for the first filler to have a hardness of greater than or equal to 500 Vickers. The first fillers may exist in the form of spheres, flakes, fibers, whiskers, or the like, or a combination including at least one of the foregoing forms. These first fillers may have cross-sectional geometries that may be circular, ellipsoidal, triangular, rectangular, polygonal, or a combination including at least one of the foregoing geometries. The first fillers, as commercially available, may exist in the form of aggregates or agglomerates prior to incorporation into the insulating layer or even after incorporation into the insulating layer. An aggregate includes more than one filler particle in physical contact with one another, while an agglomerate includes more than one aggregate in physical contact with one another.

In one embodiment, the first filler is electrically conducting. In one embodiment, the first filler has an electrical resistivity of 1 to $1\times10^7$ microohm-cm. In another embodiment, the first filler has an electrical resistivity of 5 to 50 microohm-cm. In yet another embodiment, the first filler has an electrical resistivity of 15 to 30 microohm-cm. In one embodiment, at least a portion (i.e. at least one) of the conducting fillers (ceramic and/or metal) fillers to have a hardness of greater than or equal to 500 Vickers. In another embodiment, at least a portion of the conducting fillers to have a hardness of greater than or equal to 550 Vickers. In yet another embodiment, at least a portion of the conducting fillers to have a hardness of greater than or equal to 600 Vickers. In yet another embodiment, at least a portion of the conducting fillers to have a hardness of greater than or equal to 700 Vickers.

In addition, the fillers used in the present invention are selected such that the resulting composition has a PTC trip temperature that is less than the HDT of the composition. As a result, the compositions of the present invention will heat to a certain point, but the resistivity will increase greatly (thereby preventing further heating) before the point at which the composition will begin to soften and deflect under load. In one embodiment, the compositions of the present invention have a trip temperature that is less than the HDT of the composition, and the difference between the trip temperature and the heat deflection temperature is 5° C. or greater. In another embodiment, the difference between the trip temperature and the heat deflection temperature is 10° C. or greater. In yet another embodiment, the difference between the trip temperature and the heat deflection temperature is 20° C. or greater.

Examples of suitable ceramic fillers are metal oxides, metal carbides, metal nitrides, metal hydroxides, metal oxides having hydroxide coatings, metal carbonitrides, metal oxynitrides, metal borides, metal borocarbides, or the like, or a combination including at least one of the foregoing inorganic materials. Metal cations in the foregoing ceramic fillers can be transition metals, alkali metals, alkaline earth metals, rare earth metals, or the like, or a combination including at least one of the foregoing metal cations.

Examples of suitable electrically conducting ceramic fillers are titanium diborides (TiB$_2$) tungsten carbide (WC), tin oxide, indium tin oxide (ITO), antimony tin oxide, titanium nitride (TiN), zirconium nitride (ZrN), titanium carbide (TiC), molybdenum silicide (MoSi$_2$), potassium titanate whiskers, vanadium oxides (V$_2$O$_3$), or a combination including at least one of the foregoing ceramic fillers.

As discussed, "metallic fillers" include metal powders, metal-coated particles, or any other conductive, metal-containing particles. Examples of suitable metal powders include tool steels, martensitic stainless steel, high-speed tool steels, stainless steel, iron, silicone chromium, silver, vanadium, tungsten, nickel, or the like, or a combination including at least one of the foregoing metals. Metal alloys can also be added to the electrically conducting polymer composition. Examples of metal alloys include tool steel, martensitic stainless steel stainless steel, neodymium iron boron (NdFeB), samarium cobalt (SmCo), aluminum nickel cobalt (AlNiCo), or the like, or a combination including at least one of the foregoing. Examples of metal-coated particles include conductive or non-conductive substrates coated with a layer of solid conductive metal such as aluminum, copper, magnesium, chromium, tin, nickel, silver, iron, titanium, or the like, or a combination including at least one of the foregoing metals may be used to coat the substrates.

The ceramic fillers and/or the metallic fillers can be nanoparticles or micrometer sized particles. Nanoparticles are those that have at least one dimension in the nanometer range (e.g., 10$^{-9}$ meters). Particles having at least one dimension that is less than or equal to 1,000 nanometers (nm) are considered nanoparticles, while particles having at least one dimension of greater than 1,000 nanometers are considered micrometer sized particles.

When the ceramic fillers and/or the metallic fillers are nanoparticles it is beneficial to have an average particle size of less than or equal to 500 nm. In one embodiment, it is beneficial for the average particle size to be less than or equal to 200 nm. In another embodiment, it is beneficial for the average particle size to be less than or equal to 100 nm. In yet another embodiment, it is beneficial for the average particle size to be less than or equal to 50 nm.

The ceramic fillers and metal fillers can be nano-sized or micron sized particles. If the ceramic fillers and/or the metallic fillers are micrometer-sized particles then it is beneficial to have an average particle size of greater than or equal to 1 micrometer (μm). In another embodiment, it is beneficial for the average particle size to be greater than or equal to 5 μm. In yet another embodiment, it is beneficial for the average particle size to be greater than or equal to 10 μm. In another embodiment, it is beneficial for the particle sizes to be greater than or equal to 100 μm.

The first filler is used in an amount of 1 to 95 wt %, based on the total weight of the electrically conducting polymer composition. In one embodiment, the first filler is used in an amount of 35 to 95 wt %, based on the total weight of the electrically conducting polymer composition. In yet another embodiment, the first filler is used in an amount of 45 to 95 wt %, based on the total weight of the electrically conducting polymer composition. In an exemplary embodiment, the first filler is used in an amount of 55 to 95 wt %, based on the total weight of the electrically conducting polymer composition. In one exemplary embodiment, the first filler is tool steel powder.

In those embodiments wherein the first filler includes at least one ceramic filler, the ceramic filler is generally present in an amount of 1 to 90 wt % of the total weight of the first filler. In another embodiment, the ceramic filler is present in an amount of 10 to 70 wt % of the total weight of the first filler. In another embodiment, the ceramic filler is present in an amount of 30 to 60 wt % of the total weight of the first filler. In yet another embodiment, the ceramic filler is present in an amount of 35 to 55 wt % of the total weight of the first filler.

In those embodiments wherein the first filler includes at least one metallic filler, the metallic filler is used in amount of up to 90 wt % of the total weight of the first filler. In another embodiment, the metallic filler is used in amount of up to 15 to 80 wt % of the total weight of the first filler. In another embodiment, the metallic filler is used in amount of up to 25 to 70 wt % of the total weight of the first filler. In yet another embodiment, the metallic filler is present in an amount of 35 to 60 wt % of the total weight of the first filler.

The second filler, when used, may include conductive fillers, non-conductive fillers, or a combination thereof. Conductive fillers include carbonaceous fillers such as for example carbon black, carbon nanotubes and graphite, metal fillers, metal coated fillers, or the like, or a combination including at least one of the foregoing carbonaceous fillers. Non-conductive fillers include but are not limited to include silica powder, such as fused silica and crystalline silica, boron-nitride powder, boron-silicate powders, alumina, magnesium oxide, magnesium hydroxide, wollastonite, including surface-treated wollastonite, calcium sulfate, calcium carbonate, including chalk, limestone, marble and synthetic, precipitated calcium carbonates, generally in the form of a ground particulates, talc, including fibrous, modular, needle shaped, and lamellar talc, glass spheres, both hollow and solid, kaolin, including hard, soft, calcined kaolin, and kaolin comprising various coatings to facilitate compatibility with the polymeric matrix resin, mica, feldspar, silicate spheres, flue dust, cenospheres, fillite, aluminosilicate, nano clay, natural silica sand, quartz, quartzite, perlite, tripoli, diatomaceous earth, synthetic silica, and mixtures comprising any one of the foregoing.

Carbon black having average particle sizes of less than or equal to 200 nm are beneficial. In one embodiment, the carbon black has an average particle sizes of less than or equal to 100 nm can be used. In another embodiment, the carbon black has an average particle sizes of less than or equal to 50 nm can be used. Exemplary carbon blacks are those that have surface areas greater than 200 square meter per gram (m$^2$/g). Exemplary carbon blacks include the carbon black commercially available from Columbian Chemicals under the trade name CONDUCTEX® and RAVEN; the acetylene black available from Chevron Chemical, under the trade names S.C.F. (Super Conductive Furnace) and E.C.F.® (Electric Conductive Furnace); the carbon blacks available from Cabot Corp. under the trade names VULCAN® and BLACK PEARLS®; and the carbon blacks commercially available from Akzo Co. Ltd under the trade names KETJEN BLACK EC 300® and EC 600® respectively; the carbon blacks available from Timcal under the trade name ENSACO™ & SUPER P™ as well as carbon blacks available from Degussa under the tradename PRINTEX Non-conductive, non-metallic fillers that have been coated over a substantial portion of their surface with a coherent layer of solid conductive metal may also be used in the electrically conducting polymer composition. The non-conductive, non-metallic fillers are commonly referred to as substrates, and substrates coated with a layer of solid conductive metal may be referred to as "metal coated fillers". Exemplary conductive metals such as aluminum, copper, magnesium, chromium, tin, nickel, silver, iron, titanium, or the like, or a combination including at least one of the foregoing metals may be used to coat the substrates. Examples of substrates are well known in the art and include those described in "Plastic Additives Handbook, 5th Edition" Hans Zweifel, Ed, Carl Hanser Verlag Publishers, Munich, 2001. Examples of such substrates include silica powder, such as fused silica and crystalline silica, boron-nitride powder, boron-silicate powders, alumina, magnesium oxide (or magnesia), wollastonite, including surface treated wollastonite, calcium sulfate (as its anhydride, dihydrate or trihydrate), calcium carbonate, including chalk, limestone, marble and synthetic, precipitated calcium carbonates, generally in the form of a ground particulates, talc, including fibrous, modular, needle shaped, and lamellar talc, glass spheres, both hollow and solid, kaolin, including hard, soft, calcined kaolin, mica, feldspar, silicate spheres, flue dust, cenospheres, fillite, aluminosilicate (atmospheres), natural silica sand, quartz, quartzite, perlite, tripoli, diatomaceous earth, synthetic silica, or the like, or a combination including at least one of the foregoing substrates. All of the aforementioned substrates may be coated with a layer of metallic material for use in the electrically conducting polymer composition.

Carbon nanotubes can include single wall carbon nanotubes, multiwall carbon nanotubes, or the like. The carbon nanotubes generally have aspect ratios of greater than or equal to 2. In one embodiment, the carbon nanotubes have aspect ratios of greater than or equal to 100. In another embodiment, the carbon nanotubes have aspect ratios of greater than or equal to 1,000. The carbon nanotubes have diameters of 2 nm to 500 nm. In one embodiment, the carbon nanotubes have diameters of 5 nm to 100 nm. In one embodiment, the carbon nanotubes have diameters of 10 nm to 70 nm.

Graphite fibers are generally obtained from the pyrolysis of pitch or polyacrylonitrile (PAN) based fibers. Graphite fibers having diameters of 1 micrometer to 30 micrometers and lengths of 0.5 millimeter to 2 centimeters can be used in the electrically conducting polymer composition.

Regardless of the exact size, shape, the second electrically conducting filler can be dispersed into the organic polymer in amounts of up to 80 wt % of the total weight of the electrically conducting polymer composition. In one embodiment, the second electrically conducting filler dispersed into the organic polymer in amounts of 1 to 50 wt % of the total weight of the electrically conducting polymer composition. In another embodiment, the second electrically conducting filler dispersed into the organic polymer in amounts of 5 to 30 wt % of the total weight of the electrically conducting polymer composition. In yet another embodiment, the second electrically conducting filler dispersed into the organic polymer in amounts of 5 to 20 wt % of the total weight of the electrically conducting polymer composition.

In another embodiment, fibrous, reinforcing fillers may be added to the electrically conducting polymer composition. These fibrous fillers may be electrically conducting or non-electrically conducting. When present, the fibrous, reinforcing fillers are selected from those that will impart improved properties to polymer compositions, and that have an aspect ratio greater than 1. As used herein, "fibrous" fillers may therefore exist in the form of whiskers, needles, rods, tubes, strands, elongated platelets, lamellar platelets, ellipsoids, micro fibers, nanofibers and nanotubes, elongated fullerenes, or the like. Where such fillers exist in aggregate form, an aggregate having an aspect ratio greater than 1 will also suffice for the purpose of this invention. Examples of such fillers well known in the art include those described in "Plastic Additives Handbook, 5$^{th}$ Edition" Hans Zweifel, Ed, Carl Hanser Verlag Publishers, Munich, 2001. Non-limiting examples of suitable fibrous fillers include short inorganic fibers, including processed mineral fibers such as those derived from blends including at least one of aluminum silicates, aluminum oxides, magnesium oxides, and calcium sulfate hemihydrate, boron fibers, ceramic fibers such as silicon carbide, and fibers from mixed oxides of aluminum, boron and silicon sold under the trade name NEXTEL® by 3M Co., St. Paul, Minn., USA. Also included among fibrous fillers are single crystal fibers or "whiskers" including silicon carbide, alumina, boron carbide, iron, nickel, copper. Fibrous fillers such as glass fibers, basalt fibers, including textile glass fibers and quartz may also be included.

Also included are natural organic fibers including wood flour obtained by pulverizing wood, and fibrous products such as cellulose, cotton, sisal, jute, cloth, hemp cloth, felt, and natural cellulosic fabrics such as Kraft paper, cotton paper, starch, cork flour, lignin, ground nut shells, corn, rice grain husks and mixtures including at least one of the foregoing.

Synthetic reinforcing fibers may also be used. This includes organic polymers capable of forming fibers such as polyethylene terephthalate, polybutylene terephthalate and other polyesters, polyarylates, polyethylene, polyvinylalcohol, polytetrafluoroethylene, acrylic resins, high tenacity fibers with high thermal stability including aromatic polyamides, polyaramid fibers such as those commercially available from Du Pont de Nemours under the trade name KEVLAR®, polybenzimidazole, polyimide fibers such as those available from Dow Chemical Co. under the trade names polyimide 2080 and PBZ fiber, polyphenylene sulfide, polyether ether ketone, polyimide, polybenzoxazole, aromatic polyimides or polyetherimides, and the like. Combinations of any of the foregoing synthetic reinforcing fibers may also be used.

Such reinforcing fibers may be provided in the form of monofilament or multifilament fibers and can be used either alone or in combination with other types of fiber, through, for example, co-weaving or core/sheath, side-by-side, orange-type or matrix and fibril constructions, or the like. Exemplary cowoven structures include glass fiber-carbon fiber, carbon fiber, aromatic polyimide (aramid) fiber, and aromatic polyimide fiber-glass fiber structures. Fibrous fillers may be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids.

In an exemplary embodiment, glass fibers are used as the non-conductive fibrous fillers to improve conductivity in these applications. Useful glass fibers can be formed from any type of fiberizable glass composition including those prepared from fiberizable glass compositions known as "E-glass," "A-glass," "C-glass," "D-glass," "R-glass," "S-glass," as well as E-glass derivatives that are fluorine-free and/or boron-free. Most reinforcement mats include glass fibers formed from E-glass.

Commercially produced glass fibers generally having filament diameters of 4.0 to 35.0 micrometers may be included in the electrically conducting polymer composition. The filaments may be made by standard processes, e.g., by steam or air blowing, flame blowing, and mechanical pulling. Exemplary filaments for plastics reinforcement are made by mechanical pulling. The glass fibers may be sized or unsized. Sized glass fibers are generally coated on at least a portion of their surfaces with a sizing composition selected for compatibility with the polymeric matrix material. The sizing composition facilitates wet-out and wet-through of the organic polymer upon the fiber strands and assists in attaining selected physical properties in the composition.

The glass fibers are beneficially glass strands that have been sized. In preparing the glass fibers, a number of filaments can be formed simultaneously, sized with the coating agent and then bundled into what is called a strand. Alternatively the strand itself may be first formed of filaments and then sized. The electrically non-conducting, fibrous, reinforcing fillers can be used in lengths of 0.5 millimeter to 2 centimeters. In one embodiment, the electrically non-conducting, fibrous, reinforcing fillers can be used in lengths of 1 millimeter to 1 centimeter.

The organic polymer together with the first electrically conducting filler and any other optional fillers may generally be processed in several different ways such as melt blending, solution blending, or the like, or a combination including at least one of the foregoing methods of blending. Melt blending of the composition involves the use of shear force, extensional force, compressive force, ultrasonic energy, electromagnetic energy, thermal energy or a combination including at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or a combination including at least one of the foregoing.

Melt blending involving the aforementioned forces may be conducted in single or multiple screw extruders, Buss kneader, Henschel, helicones, Ross mixer, Banbury, roll mills, molding machines such as injection molding machines, vacuum forming machines, blow molding machine, or the like, or a combination including at least one of the foregoing machines. It is generally beneficial during melt or solution blending of the organic polymer and the electrically conducting filler to impart a specific energy of 0.01 to 10 kilowatt-hour/kilogram (kwhr/kg) to the composition.

In one embodiment, an organic polymer is blended with a first filler including at least one ceramic filler, at least one metallic filler, or a combination including at least one of the foregoing fillers and a second filler comprising at least one conductive filler, at least one non-conductive filler, or a combination thereof to generate continuous network. In another embodiment, an organic polymer is blended with first filler including at least one ceramic filler, at least one metallic filler, or a combination including at least one of the foregoing fillers and the resulting blend is mixed with a second filler comprising at least one conductive and/or non-conductive filler.

In one embodiment, the organic polymer in powder form, pellet form, sheet form, or the like, may be first dry blended with a first filler and a second filler in a Henschel or a roll mill, prior to being fed into a device such as an extruder or Buss kneader. In another embodiment, the polymer, first filler and second filler is introduced into the melt-blending device in the form of a masterbatch. In such a process, the masterbatch may optionally be introduced into the melt-blending device downstream of the organic polymer.

When a masterbatch is used, the first filler may be present in a masterbatch and the masterbatch may be used in an amount of 1 to 50 wt %, of the total weight of the final composition. In one embodiment, the first filler masterbatch is used in an amount of 5 to 45 wt % of the total weight of the final composition. In another embodiment, the first filler masterbatch is used in an amount of 8 to 40 wt % of the total weight of the final composition. In yet another embodiment, the first filler masterbatch is used in an amount of 10 to 30 wt % of the total weight of the final composition. The second filler may also be added to the electrically conducting polymer composition in masterbatch form.

In another embodiment relating to the use of masterbatches in polymeric blends, it is sometimes beneficial to have the masterbatch including an organic polymer that is chemically the same as the composition that forms the continuous phase of the electrically conducting polymer composition. In yet another embodiment relating to the use of masterbatches in the electrically conducting polymer composition, it may be beneficial to have the masterbatch including an organic polymer that is chemically different from the other organic polymers that are used in the electrically conducting polymer composition.

The electrically conducting polymer composition including the organic polymer and the first electrically conducting filler may be subject to multiple blending and forming steps in alternative embodiments. For example, the electrically conducting polymer composition may first be extruded and formed into pellets. The pellets may then be fed into a molding machine where it may be formed into other selected shapes. Alternatively, the electrically conducting polymer composition emanating from a melt blender may be formed into sheets or strands and subjected to post-extrusion processes such as annealing, uniaxial or biaxial orientation.

In one embodiment, solution blending may also be used to manufacture the electrically conducting polymer composition. The solution blending may also use additional energy such as shear, compression, ultrasonic vibration, or the like to promote homogenization of the electrically conducting filler with the organic polymer. In one embodiment, the organic polymer can be suspended in a fluid and then introduced into an ultrasonic sonicator along with the electrically conducting filler to form a mixture. The mixture may be solution blended by sonication for a time period effective to disperse the electrically conducting filler particles within the organic polymer. The mixture may then be dried, extruded and molded in alternative embodiments. It is generally beneficial for the fluid to swell the organic polymer during the process of sonication. Swelling the organic polymer generally improves the ability of the electrically conducting filler to impregnate the amorphous organic filler during the solution blending process and consequently improves dispersion.

In another embodiment related to solution blending, the first electrically conducting filler along with optional fillers are sonicated together with organic polymer precursors. Organic polymer precursors are generally monomers, dimers, trimers, or the like, which can be reacted into organic polymers. A fluid such as a solvent may be introduced into the sonicator with the electrically conducting filler and the organic polymer precursor. The time period for the sonication is generally an amount effective to promote encapsulation of the electrically conducting filler by the organic polymer precursor. After the encapsulation, the organic polymer precursor is then polymerized to form an organic polymer within which is dispersed the electrically conducting filler.

In select embodiments of the present invention, at least one solvent is used in the solution blending of the electrically conducting polymer composition. The solvent may be used as a viscosity modifier, or to facilitate the dispersion and/or suspension of electrically conducting filler. Liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone, or the like, or a combination including at least one of the foregoing solvents may be used. Polar protic solvents such as water, methanol, acetonitrile, nitromethane, ethanol, propanol, isopropanol, butanol, or the like, or a combination including at least one of the foregoing polar protic solvents may be used. Other non-polar solvents such benzene, toluene, methylene chloride, carbon tetrachloride, hexane, diethyl ether, tetrahydrofuran, or the like, or a combination including at least one of the foregoing solvents may also be used in alternative embodiments. Co-solvents including at least one aprotic polar solvent and at least one non-polar solvent may also be used. In one embodiment, the solvent is xylene or N-methylpyrrolidone.

If a solvent is used, it may be utilized in an amount of 1 to 50 wt %, of the total weight of the electrically conducting polymer composition. In one embodiment, if a solvent is used, it may be utilized in an amount of 3 to 30 wt %, of the total weight of the electrically conducting polymer composition. In yet another embodiment, if a solvent is used, it may be utilized in an amount of 5 to 20 wt %, of the total weight of the electrically conducting polymer composition. It is generally beneficial to evaporate the solvent before, during and/or after the blending of the electrically conducting polymer composition.

These electrically conducting polymer compositions generally have an electrical volume resistivity at room temperature of less than or equal to $1\times10^5$ ohm-cm in one embodiment, less than or equal to $1\times10^4$ ohm-cm in another embodiment, less than or equal to $1\times10^3$ ohm-cm in still another embodiment, and less than or equal to $1\times10^2$ ohm-cm in yet another embodiment.

In one embodiment, the electrically conducting polymer compositions have a room temperature volume resistivity of less than or equal to compositions have a room temperature volume resistivity of less than or equal to $1\times10^4$ ohm-cm and a positive temperature coefficient of resistance (PTCR) intensity of at least 5. In another embodiment, the electrically conducting polymer compositions to have a positive coefficient of temperature resistance (PTCR) intensity of at least 10. In yet another embodiment, the electrically conducting polymer compositions to have a positive temperature coefficient of resistance (PTCR) intensity of at least 20. In yet another embodiment, the electrically conducting polymer compositions to have a positive temperature coefficient of resistance (PTCR) intensity of at least 30. In yet another embodiment, the electrically conducting polymer compositions to have a positive coefficient of temperature resistance (PTCR) intensity of at least 100. In yet another embodiment, the electrically conducting polymer compositions to have a positive temperature coefficient of resistance (PTCR) intensity of at least 1,000.

As noted above, the electrically conducting polymer compositions advantageously display a PTCR repeatability of at least 100 cycles when cycled between room temperature and the trip temperature based upon measurements taken on the $2^{nd}$ cycle and the $100^{th}$ cycle. In other words, a difference in room temperature resistivity between the $2^{nd}$ cycle and the $100^{th}$ cycle is less than or equal to a factor of 5. In one embodiment, the electrically conducting polymer compositions display a PTCR repeatability of at least 200 cycles when cycled between room temperature and the trip temperature. In another embodiment, the electrically conducting polymer compositions display a PTCR repeatability of at least 500 cycles when cycled between room temperature and the trip temperature. In yet another embodiment, the electrically conducting polymer compositions display a PTCR repeatability of at least 1,000 cycles when cycled between room temperature and the trip temperature.

In yet another embodiment, the electrically conducting polymer composition also has a Class A surface finish when molded. Molded articles can be manufactured by injection molding, injection-compression molding, compounding-injection molding, blow molding, compression molding, thermoforming or the like, or a combination including at least one of the foregoing molding processes.

As discussed previously, the compositions of the present invention can have a trip temperature at least 5° C. lower, and in many embodiments at least 10° C. lower than the HDT of the underlying base resin. As a result, the compositions of the present invention will heat up to a temperature and trip before reaching the HDT of the composition. Since the compositions trip before reaching the HDT, the compositions do not deform when pressure or an impact force is applied to them at this temperature level. Therefore, the compositions of the present invention can be used in structural applications unlike prior art PTC materials that trip at or above the HDT of the material. Because a material that trips at or above the HDT will deform if used in structural applications.

As a result, the electrically conducting polymer composition can advantageously be used in articles in a wide variety of applications. Examples of such applications include, but are not limited to, heating elements for heaters, thermostats, reversible electrical fuses The composition may be used to prepare molded articles such as durable articles, structural products, and electrical and electronic components, and the like, particularly in articles such as self-controlled heaters, over-current protection devices, air conditioning units, automotive applications, such as heated seats, heated mirrors, heated windows, heated steering wheels, and the like, circuit protection devices, perfume dispensers and any other application in which a thermoplastic or thermoset PTC material may be used.

The following examples, which are meant to be exemplary, not limiting, illustrate compositions and methods of manufacturing of some of the various embodiments of the electrically conducting polymer compositions and the methods of manufacture described herein.

EXAMPLES

This example was conducted to demonstrate and compare the PTCR capabilities of electrically conducting polymer compositions and the effect of second filler in PTCR characteristics. First fillers (M1) that include fillers that have a hardness of greater than or equal to 500 Vickers and second filler include conductive or non-conductive fillers. Tables 1 and 2 detail electrically conducting polymer compositions that include fillers that have a hardness of greater than or equal to 500 Vickers while Table 3 details comparative electrically conducting polymer compositions that include fillers that have a hardness of less than or equal to 500 Vickers. Table 4 details the electrical resistivity of the polymeric composition as a function of filler content. Table 5 and 6 detail the synergy between primary and second fillers in tuning the trip temperature of conductive polymeric composition. It can be seen that by keeping the first filler constant, above or below the percolation level, tunable trip temperature can be achieved by modulating the percentage of second fillers.

All formulations are compounded on Werner and Pfleiderer 25 mm co-rotating 10-barrel twin-screw extruder. The temperature profile used for Nylon 6 compositions is 220 to 270° C. (i.e., the barrel temperatures were adjusted to be in the range of 220 to 270° C., with the lowest temperature of 220° C. being used at the throat of the extruder and the highest temperature of 270° C. being used near the die of the extruder) with a die temperature of 270° C. In a similar manner, the temperature profile for the PBT compositions was 200 to 260° C. with a die temperature of 270° C. Similarly, the temperature profile for the PEI compositions was 300 to 345° C. with a die temperature of 345° C. Similarly, the temperature profile for the polypropylene compositions was 190 to 240° C., with a die temperature of 240° C. In all of the temperature profiles described above, the lowest temperature for a given composition was maintained near the extruder throat, while the highest temperature was maintained near the die.

All PTCR formulations were extruded at constant screw speed of 300 rpm and pelletized to make granules. Formulations were injection molded on 85T molding machines from Larsen and Toubro (L&T) for standard ISO 180 impact bar samples with the mold temperature of Nylon 6 compositions being 70° C., PBT compositions being 60° C., PEI compositions being 110° C., and polypropylene compositions being 40° C.

The PTCR trip temperature is the intersection point determined by taking a tangent to the first slope and the second slope. PTCR cyclability was determined by whether the electrically conducting polymer composition underwent at least 100 cycles between room temperature and the trip temperature with a trip temperature difference (Delta T) of less than or equal to 10° C. In the Tables 1, 2 and 3, RT2 indicates the room temperature resistivity in ohm-centimeters (ohm-cm) after 2 cycles, while RT100 indicates the room temperature resistivity in ohm-cm after 100 cycles. Delta RT indicates the change in measured room temperature resistivity in ohm-cm of the respective sample between 2 and 100 cycles. T2 indicates the trip temperature after 2 cycles, while T100 indicates the trip temperature after 100 cycles. Delta T indicates the change in the trip temperature in (° C.). The rate of temperature increase during the cycling was 1.25° C. per minute. Cooling of the sample was conducted via natural convection.

The heat of crystallization was measured using Perkin Elmer Differential Scanning calorimeter and the heating rate was around 20 C/min in nitrogen atmosphere and air-cooled.

Specific Volume expansion studies on the polymer composites were studied using the GNOMIX PVT apparatus. The studies were done at an isobaric pressure of 10 Mpa and the Specific Volume in cc/g were investigated as a function of the temperature (From Room temperature to 200 C for PA6, Room temperature to 290 C for PPS Room temperature to 180 C for PP).

TABLE 1

| | Sample # | | | | | | |
|---|---|---|---|---|---|---|---|
| | 1 | 2 | 3 | 4 | 5 | 6 | 7 |
| Composition | | | | | | | |
| Polymer | Nylon 6 | Nylon 6 | Nylon 6 | Nylon 6 | Polypropylene | PBT* | PEI** |
| Filler type | Stainless steel | TiB$_2$ | NdFeB | NdFeB | Stainless steel | Stainless steel | Stainless steel |
| Filler Grade/Commercial Name | CPM 9 V | HCT 30 | MQP-13-9 | NQP-L | CPM 9 V | CPM 9 V | CPM 9 V |
| Filler shape Properties | Spherical | Flaky | Spherical | Flaky | Spherical | Spherical | Spherical |
| Filler hardness (Vickers) | 576 | 3000 | 1000 | 1000 | 576 | 576 | 576 |
| Filler Loading (wt %) | 86.3 | 75.5 | 81.2 | 81.2 | 89 | 83 | 85.3 |
| Conductivity (ohm-cm) | 1.3 | 32 | 12.5 | 33,000 | 13.9 | 2.6 | 10.5 |
| PTC trip temperature (° C) | 165 | 125 | 125 | 125 | 105 | 130 | 215 |
| PTCR effect | Yes | Yes | Yes | Yes | Yes | Yes | Yes |
| PTCR cyclability | Yes | Yes | Yes | Yes | Yes | Yes | Yes |
| RT2 (ohm-cm) | 1.3 | 67 | 12.5 | 33,000 | 13.9 | 4.2 | 10.5 |
| RT100 (ohm-cm) | 1.6 | 70 | 30.5 | 31,000 | 8.8 | 9.0 | 18.6 |
| Delta RT (ohm-cm) | 0.3 | 3 | 18 | −2,000 | 5.1 | 4.8 | 8.1 |
| T2 (° C.) | 165 | 45 | 125 | 125 | 105 | 117 | 215 |
| T100 (° C.) | 164 | 52 | 130 | 126 | 100 | 115 | 210 |
| Delta T (° C.) | 1 | 7 | 5 | 1 | 5 | 2 | 5 |

*PBT = polybutylene terephthalate;
**PEI = polyetherimide

TABLE 2

| | Sample # | | | | | |
|---|---|---|---|---|---|---|
| | 8 | 9 | 10 | 11 | 12 | 13 |
| Composition | | | | | | |
| Polymer | Nylon 6 | Nylon 6 | Nylon 6 | Nylon 6 | Nylon 6 | Nylon 6 |
| Filler type | Stainless steel | Stainless steel | Stainless steel | Stainless steel | Stainless steel | Stainless steel |

TABLE 2-continued

| | Sample # | | | | | |
|---|---|---|---|---|---|---|
| | 8 | 9 | 10 | 11 | 12 | 13 |
| Filler Grade/Commercial Name | M2 | M15 | M42 | A11 150 mu | A11 500 mu | A11 500 mu + A11 150 mu |
| Filler shape Properties | Irregular | Irregular | Irregular | Spherical | Spherical | Spherical |
| Filler hardness (Vickers) | 723 | 800 | 971 | 576 | 576 | 576 |
| Filler Loading (wt %) | 82 | 82 | 82 | 90 | 90 | 90 |
| Conductivity (ohm-cm) | 0.16 | 0.08 | 1.2 | 3.9 | 63.2 | 0.66 |
| PTCR trip temperature (° C.) | 145 | 140 | 137 | 165 | 145 | 113 |
| PTCR effect | Yes | Yes | Yes | Yes | Yes | Yes |
| PTCR cyclability | Yes | Yes | Yes | Yes | Yes | Yes |
| RT2 (ohm-cm) | 0.16 | 0.08 | 0.15 | 44.3 | 66.9 | 1.39 |
| RT100 (ohm-cm) | 0.27 | 0.15 | 0.51 | 49 | 69 | 1.6 |
| Delta RT (ohm-cm) | 0.11 | 0.07 | 0.36 | 4.7 | 2.1 | 0.21 |
| T2 (° C.) | 145 | 140 | 137 | 143 | 145 | 158 |
| T100 (° C.) | 145 | 137 | 139 | 147 | 147 | 160 |
| Delta T (° C.) | 0 | 3 | 2 | 4 | 2 | 2 |

TABLE 3

| | Sample # | | |
|---|---|---|---|
| | Comp. 1 | Comp. 2 | Comp. 3 |
| Composition | | | |
| Polymer | Nylon 6 | Nylon 6 | PC |
| Filler type | Copper | Stainless Steel | Stainless Steel |
| Filler Grade | CP 154 | SS 410L | SS 410L |
| Filler shape Properties | Spherical | Irregular | Irregular |
| Filler hardness (Vickers) | 90 | 250 | 250 |
| Filler Loading (wt %) | 89.3 | 78.4 | 78.4 |
| Conductivity (ohm-cm) | 35,000 | 0.42 | 1,500 |
| PTCR trip temperature (° C.) | 130 | 107 | 90 |
| PTCR effect | Yes | Yes | Yes |
| PTCR cyclability | No | No | No |
| RT2 (ohm-cm) | 65k* | 2 | 1,500 |
| RT 100 (ohm-cm) | NC | 43.5 | 35,000 |
| Delta RT (ohm-cm) | | 41.5 | 33,500 |
| T2 (° C.) | NA | 110 | 90 |
| T100 (° C.) | NA | 122 | 135 |
| Delta T (° C.) | | 12 | 45 |

*k = kilo

TABLE 4

| Effect of Filler loading on trip characteristics | | | |
|---|---|---|---|
| Material | Batch 1 | Batch 2 | Batch 3 |
| PA6 (vol %) | 74.60 | 73.25 | 67.10 |
| M2 (vol %) | 25.40 | 26.75 | 32.90 |
| Trip (dec C.) | 76 | 76 | 105 |
| Resistivity (Ohm-cm) | 3.93 | 3.88 | 0.95 |
| Sp. Gr | 2.74 | 2.83 | 3.22 |
| PTCR effect | Yes | Yes | Yes |
| PTCRcyclability | Yes | Yes | Yes |
| RT2 (ohm-cm) | 3.93 | 3.88 | 0.95 |
| Delta RT (ohm-cm) | 1.68 | 0.07 | 0.27 |
| T2 (° C.) | 76 | 77 | 105 |

*M2 = tool stainless steel powder,
* PA6 = Nylon6

TABLE 5

| Synergy with Conducting Carbon Black | | | | | | | |
|---|---|---|---|---|---|---|---|
| | Batch 4 | Batch 5 | Batch 6 | Batch 7 | Batch 8 | Batch 9 | Batch 10 |
| PA6 (vol %) | 79.00 | 73.99 | 71.10 | 64.65 | 68.60 | 55.8 | 77.86 |
| M2 (vol %) | 20.18 | 20.2 | 22.45 | 22.40 | 18.93 | 30.25 | 12.23 |
| Printex G (vol %) | 0.82 | 5.81 | 6.45 | 12.95 | 12.47 | 13.95 | 9.91 |
| Properties | | | | | | | |
| Trip | NC | 65 | 90 | NT | NT | NT | NC |
| Resistivity | NC | 31.35 | 11.4 | 11.13 | 114230 | 0.45 | NC |
| Sp. Gr | 2.42 | 2.48 | 2.62 | 2.69 | 2.47 | 3.2 | 2.02 |
| PTCR effect | No | Yes | Yes | No | No | No | No |
| PTCR cyclability | No | Yes | Yes | No | No | No | No |

TABLE 5-continued

Synergy with Conducting Carbon Black

|  | Batch 4 | Batch 5 | Batch 6 | Batch 7 | Batch 8 | Batch 9 | Batch 10 |
|---|---|---|---|---|---|---|---|
| RT2 (ohm-cm) | NA | 32.81 | 5.45 | NA | NA | NA | NA |
| RT 100 (ohm-cm) | NA | 34.12 | 13.9 | NA | NA | NA | NA |
| Delta RT (ohm-cm) | NA | 1.31 | 8.45 | NA | NA | NA | NA |
| T2 (° C.) | NA | 65 | 85 | NA | NA | NA | NA |
| T100 (° C.) | NA | 70 | 85 | NA | NA | NA | NA |
| Delta T (° C.) | NA | 5 | 0 | NA | NA | NA | NA |

*NC—Non conducting- conducting particle concentration (either steel or carbon) is too low to form a conducting chain.
*NT—Conducting but no Trip (no spike in the resistivity, only a gradual increase in the resistivity)

TABLE 6

Synergy with Non-conducting fillers

|  | Batch 11 | Batch 12 | Batch 13 | Batch 14 | Batch 15 | Batch 16 | Batch 17 | Batch 18 |
|---|---|---|---|---|---|---|---|---|
| PA6 (vol %) | 73.50 | 70.00 | 65.00 | 60.00 | 50.00 | 35.00 | 30.00 | 69.00 |
| M2 (vol %) | 24.50 | 25.00 | 25.00 | 25.00 | 25.00 | 25.00 | 25.00 | 24.00 |
| Closite 93A (vol %) | 2.00 | | | | | | | |
| Glass powder (vol %) | | 5.00 | 10.00 | 15.00 | 25.00 | 40 | 45 | 5.75 |
| KjB (vol %) | | | | | | | | 1.25 |
| Properties | | | | | | | | |
| Trip | 66 | 60 | 85 | 100 | 120 | 160 | 170 | 73 |
| Resistivity | 5.55 | 2.78 | 2.95 | 2.02 | 0.72 | 0.17 | 0.17 | 2.94 |
| Sp. Gr | 2.7 | 2.78 | 2.84 | 2.91 | 3.03 | 3.22 | 3.28 | 2.74 |
| PTCR effect | Yes | Yes | Yes | Yes | Yes | Yes | Yes | Yes |
| PTCR cyclability | Yes | Yes | Yes | Yes | Yes | Yes | Yes | Yes |
| RT2 (ohm-cm) | 9.86 | 3.48 | 3.99 | 1.25 |  | 1.61 | 1.94 | 7.29 |
| RT 100 (ohm-cm) |  | 24.98 | 17.52 | 1.87 | 1.42 |  |  |  |
| Delta RT (ohm-cm) | 4.31 | 0.70 | 1.04 | −0.77 | 0.7 | 1.44 | 1.77 | 4.35 |
| T2 (° C.) | 65 | 77 | 77 | 105 |  | 165 | 170 | 77 |
| T100 (° C.) |  | 75 | 80 | 100 | 120 |  |  |  |
| Delta T (° C.) | −1 | −2 | 3 | −5 | 0 | 5 | 0 | 4 |

From the Tables 1 and 2, it can be seen that fillers having spherical shapes as well as those having irregular shapes can produce reproducible PTCR effects so long as they have a Vickers hardness of greater than or equal to 500. Comparing the properties of the samples from Tables 1 and 2 with those from Table 3, it can be seen that those from Table 3 do not show the cyclability of the PTCR effect. More specifically, from Tables 1 and 2 (which exemplify fillers having a hardness of greater than or equal to 500) it can be seen that the difference in trip temperature (Delta T) upon being cycled 100 times is less or equal to 10° C., while the difference in room temperature resistivity (Delta RT) upon being cycled 100 times is generally less than 20. On the other hand, from Table 3, it may be seen that the difference in trip temperature (Delta T) is greater than 10° C. while the room temperature resistivity (Delta RT) upon being cycled 100 times is generally greater than 20.

From the Table 4, for getting trip temperature of 105° C., about 33 vol % metal powder was added that lead to a specific gravity of 3.22. Where as the same trip temperature was achieved by adding 15 vol % glass powder into 25 vol % stainless steel powder with a specific gravity of 2.91 (Table 6, Batch#14). From the Tables 5 & 6, it can be clearly seen that by varying the second filler and keeping the first filler constant, it is possible to tune the trip temperature.

In the following examples, it can be seen how varying one or more process factors can also enable the trip temperature to be varied, thereby enabling the trip temperature to be tuned to a selected number. For example, Table 7 shows the delta volume expansion of the polymer composites at the trip temperature. Depending on the choice of the polymer present in the composite the initial specific volume occupied would be different. However the percentage volume expansion is only 1-2% close to the trip temperatures, from the room temperature specific volume.

TABLE 7

Delta Volume Expansion -Specific volume changes at the trip temperature

| Composition | | | | | |
|---|---|---|---|---|---|
| Type of polymer | PP | PA6 | PA6 | PPS | PEI |
| Filler type | High Speed Steel | High Speed Steel | High Speed Steel | High Speed Steel | High Speed Steel |
| Filler loading wt % | 84.69 | 81.25 | 81.25 | 81.25 | 81.25 |
| Filler Grade | M2 | M2 | M2 | M2 | M2 |
| filler Shape | Irregular | Irregular | Irregular | Irregular | Irregular |
| Process | Injection Molding | Injection Molding | Injection Molding | Injection Molding | Injection Molding |

TABLE 7-continued

Delta Volume Expansion -Specific volume changes at the trip temperature

Composition

| Post Processing | None | None | Quenched in Liq N2 | None | None |
|---|---|---|---|---|---|
| PTCR effect | Yes | Yes | Yes | Yes | Yes |
| PTCR cyclability | Yes | Yes | Yes | Yes | Yes |
| Trip Temperature C. | 82.6 | 102.4 | 88.2 | 144.2 | 188.8 |
| RT resisitvity ohm-cm | 1 | 0.229 | 7.1 | 1.6 | 2.73 |
| Delta Volume/V % | 0.99 | 1.71 | 1.54 | 1.76 | 1.82 |

Tables 8 and 9 show the effect of various post-processing cooling steps and their effect on the trip temperature. As may be seen, a lower trip temperature can be established using a cooling step, with the faster the cooling, the lower the resulting trip temperature of the composition. Quenching with liquid nitrogen resulted in a lower trip temperature than simply using a water bath, which was lower than using a natural cooling step. Annealing the composition resulted in a higher trip temperature. In Table 10, the rate of cooling again showed how the trip temperature could be tuned. Therefore, using a subsequent cooling or heating step could tune the trip temperature as compared to the trip temperature that resulted from manufacturing the composition.

TABLE 8

Effect of Cooling rates on Trip Temperature Behavior

| Type of polymer | PA6 | PA6 | PA6 | PA6 |
|---|---|---|---|---|
| Filler type | High Speed Steel | High Speed Steel | High Speed Steel | High Speed Steel |
| Filler loading wt % | 81.25 | 81.25 | 81.25 | 81.25 |
| Filler Grade | M2 | M2 | M2 | M2 |
| filler Shape | Irregular | Irregular | Irregular | Irregular |
| Process | Injection Molding | Injection Molding | Injection Molding | Injection Molding |
| Post Processing | Quenched LN2 | Water cooled | As molded | Annealed to 180 C. |
| PTCR effect | Yes | Yes | Yes | Yes |
| PTCR cyclability | Yes | Yes | Yes | Yes |
| Trip Temperature C. | 88.7 | 99.8 | 102.4 | 123.5 |
| RT resisitvity ohm-cm | 7.1 | 0.641 | 0.364 | 0.5252 |
| delta Hcrys. | 2.3 | | 11.5 | 12.7 |

TABLE 9

Effect of Cooling Rates on Trip Temperature

Composition

| Type of polymer | PA6 | PA6 | PA6 |
|---|---|---|---|
| Filler type | High Speed Steel | High Speed Steel | High Speed Steel |
| Filler loading wt % | 81.25 | 81.25 | 81.25 |
| Filler Grade | M2 | M2 | M2 |
| filler Shape | Irregular | Irregular | Irregular |
| Process | Injection Molding | Injection Molding | Injection Molding |
| Cooling process after meltingat 290 C. | Quenched LN2 | 10degree/min | None |
| PTCR effect | Yes | Yes | Yes |
| PTCR cyclability | Yes | Yes | Yes |
| Trip Temperature C. | 68.3 | 88.2 | 90 |
| RT resisitvity ohm-cm | 5.56 | 4.31 | 1.64 |

Table 10 shows that the method of moding the composition can also be used to tune the trip temperature. In these examples, injection molding of the composition resulted in lower trip temperatures than compression molding.

TABLE 10

Effects of Molding on Trip Temperature

| Composition | 1 | 2 | 3 | 4 |
|---|---|---|---|---|
| Type of polymer | PA6 | PA6 | PP | PP |
| Filler type | High Speed Steel | High Speed Steel | High Speed Steel | High Speed Steel |
| Filler loading wt % | 81.25 | 81.25 | 84.69 | 84.69 |
| Filler Grade | M2 | M2 | M2 | M2 |
| filler Shape | Irregular | Irregular | Irregular | Irregular |
| Process | Injection Molding | Compression Molding | Injection Molding | Compression Molding |
| PTCR effect | Yes | Yes | Yes | Yes |
| PTCR cyclability | Yes | Yes | Yes | Yes |
| Trip Temperature C. | 102.4 | 116.3 | 82.8 | 101.7 |
| RT resisitvity ohm-cm | 0.364 | 7.85 | 1 | 8.62 |
| delta Hcrys. | 11.5 | 13.5 | | 12.7 |

Thus clearly the hardness of the fillers plays an important role in the generation of the PTCR effect and also in the ability of the electrically conducting polymer composition to be repeatedly cycled between room temperature (25° C.) and the trip temperature.

As set forth herein, compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs. Where a measurement is followed by the notation "(±10%)" or "(±3%)", the measurement may vary within the indicated percentage either positively or negatively. This variance may be manifested in the sample as a whole (e.g., a sample that has a uniform width that is within the indicated percentage of the stated value), or by variation(s) within the sample (e.g., a sample having a variable width, all such variations being within the indicated percentage of the stated value).

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. An electrically conducting polymer composition comprising:
    an organic polymer; and
    a filler including at least one ceramic filler, at least one metallic filler, or a combination including at least one of the foregoing fillers;
    wherein at least a portion of filler has a hardness of greater than or equal to 500 Vickers;
    further wherein the composition has a trip temperature less than the heat deflection temperature of the composition at 0.45 MPa and wherein the difference between the trip temperature and the heat deflection temperature is 10° C. or greater.

2. The composition of claim 1, having a room temperature volume resistivity of less than or equal to $1 \times 10^4$ ohm-cm and a positive temperature coefficient of resistance intensity of at least 5.

3. The composition of claim 1, wherein the difference between the trip temperature of the composition between a 2nd cycle and a 100th cycle is less than or equal to 10° C.

4. The composition of claim 1, wherein the filler includes a ceramic filler that is electrically conducting and comprises titanium diboride, tin oxide, indium tin oxide, antimony tin oxide, tungsten carbide, titanium nitride, zirconium nitride, titanium carbide, molybdenum silicide, potassium titanate whiskers, vanadium oxide or a combination comprising at least one of the foregoing ceramic fillers.

5. The composition of claim 1, wherein the filler includes a metallic filler that comprises silver, vanadium, tungsten, nickel, stainless steel, tool steel, neodymium iron boron (NdFeB), samarium cobalt (SmCo), aluminum nickel cobalt (AlNiCo), or a combination comprising at least one of the foregoing metallic filler.

6. The composition of claim 1, wherein the filler has an average particle size of less than or equal to 1000 microns.

7. The composition of claim 1, wherein the filler has an average particle size of less than or equal to 250 microns.

8. The composition of claim 1, wherein the filler is present in an amount of 20 to 95 wt % of the total weight of the electrically conducting polymer composition.

9. The composition of claim 1, wherein the organic polymer is an amorphous polymer or a semi-crystalline polymer.

10. The composition of claim 1, wherein a molded article formed from the electrically conducting polymer composition has a Class A surface finish.

11. The composition of claim 1, wherein the electrically conducting polymer composition has an electrical volume resistivity of less than or equal to $1 \times 10^4$ ohm-cm.

12. The composition of claim 1, wherein the composition has a specific volume change between 0.5-5% at the trip temperature.

13. An article comprising the composition of claim 1.

14. A method comprising:
    blending an organic polymer with a first filler including at least one ceramic filler, at least one metallic filler, or a combination including at least one of the foregoing fillers to form an electrically conducting polymer composition,
    wherein at least a portion of the first filler has a hardness of greater than or equal to 500 Vickers; further wherein the electrically conducting polymer composition has a trip temperature less than the heat deflection temperature of the composition at 0.45 MPa and wherein the difference between the trip temperature and the heat deflection temperature is 10° C. or greater; and
    molding the electrically conducting polymer composition.

15. The method of claim 14 further comprising the step of: adding a second filler prior to molding in an amount sufficient to generate a continuous conductive network in the composition.

16. The method of claim 15, wherein the blending step is selected from solution blending, melt blending or a combination including at least one of the foregoing blending steps.

17. The method of claim 14, further comprising the step of tuning a trip temperature of the electrically conducting polymer composition using an additional processing step.

18. The method of claim 17, wherein the additional processing step comprises controlling the cooling rate in the part formation step to tune the trip temperature.

19. The method of claim 18, wherein the cooling process is selected to have a cooling rate of 1° C./min to 1500° C./min.

20. The method of claim 17, wherein the additional processing step is a heating process to tune the trip temperature.

21. The method of claim 20, wherein the heating process is selected from the step of annealing the electrically conducting polymer composition.

22. The method of claim 17, wherein the additional processing step is a molding process selected from injection molding, compression molding, injection-compression molding, thermoforming, or a combination including at least one of the foregoing process.

23. An article comprising a composition made by the method of claim 14.

* * * * *